(12) United States Patent
Chou

(10) Patent No.: US 7,225,580 B1
(45) Date of Patent: Jun. 5, 2007

(54) FISHING BOBBER HAVING LIGHT DEVICE

(76) Inventor: Jason Chou, No. 15, Lane 47, Yonlong 9th Street, Dali City, Taichung Hsien 41267 (TW)

( * ) Notice: Subject to any disclaimer, the term of this patent is extended or adjusted under 35 U.S.C. 154(b) by 0 days.

(21) Appl. No.: 11/317,443

(22) Filed: Dec. 24, 2005

(51) Int. Cl.
*A01K 75/02* (2006.01)

(52) U.S. Cl. .......................................... 43/17.5; 43/17

(58) Field of Classification Search ................ 43/17.5, 43/17
See application file for complete search history.

(56) References Cited

U.S. PATENT DOCUMENTS

| | | | | |
|---|---|---|---|---|
| 2,201,588 | A | | 5/1940 | Kuhns |
| 2,539,403 | A | * | 1/1951 | Crim et al. ................... 441/17 |
| 4,109,405 | A | * | 8/1978 | Ito ............................... 43/17.5 |
| 4,291,484 | A | | 9/1981 | Young .......................... 43/17.5 |
| 4,461,114 | A | * | 7/1984 | Riead ........................... 43/17.5 |
| 4,658,532 | A | * | 4/1987 | McFarland et al. .......... 43/17.5 |
| 4,760,664 | A | * | 8/1988 | Amendola ................... 43/17.5 |
| 4,827,655 | A | * | 5/1989 | Reed ............................ 43/17.5 |
| 4,884,355 | A | * | 12/1989 | Neihoff et al. ................ 43/17 |
| 5,119,578 | A | * | 6/1992 | Johnson ........................ 43/17 |
| 5,351,432 | A | * | 10/1994 | Tse ............................. 43/17.5 |
| 5,615,512 | A | * | 4/1997 | Wang .......................... 43/17.5 |
| 5,819,465 | A | * | 10/1998 | Bryant ........................... 43/16 |
| 5,898,372 | A | * | 4/1999 | Johnson et al. .......... 340/573.2 |
| 5,915,941 | A | * | 6/1999 | Casey ......................... 43/17.5 |
| 5,937,566 | A | * | 8/1999 | Buczkowski et al. ........ 43/17.5 |
| 5,974,721 | A | * | 11/1999 | Johnson et al. .............. 43/17.6 |
| 6,138,398 | A | * | 10/2000 | Livingston ..................... 43/17 |
| 6,671,994 | B1 | * | 1/2004 | Klein ............................. 43/17 |
| 6,715,229 | B2 | * | 4/2004 | Chu ............................. 43/17.5 |
| 2004/0111950 | A1 | * | 6/2004 | Lindgren ..................... 43/17.5 |
| 2005/0155272 | A1 | * | 7/2005 | Liu .............................. 43/17.5 |

\* cited by examiner

*Primary Examiner*—Kurt Rowan
(74) *Attorney, Agent, or Firm*—Charles E. Baxley

(57) ABSTRACT

A bobber includes a housing having a casing extended into a receptacle, a circuit board is disposed in the housing, a processor device and one or more light members are attached onto the circuit board, one or more batteries are electrically coupled to the circuit board. A switch device is coupled to the processor device and includes two conductor blades each having a leg extended into the casing, and a ball is disposed in the casing and engageable with the legs of the conductor blades for electrically coupling the legs of the conductor blades together, the ball is arranged to be disengaged from either or both the legs and to switch off the electrical coupling between the legs of the conductor blades when a fish strikes.

6 Claims, 3 Drawing Sheets

FISHING BOBBER HAVING LIGHT DEVICE

BACKGROUND OF THE INVENTION

1. Field of the Invention

The present invention relates to a fishing bobber for fishlines, and more particularly to a fishing bobber having a sensitive light device for generating indicating lights when a fish bites on the line to which the bobber is attached and for guiding the user to pull the fishline at the right time and to suitably catch the fish.

2. Description of the Prior Art

Typical fishing bobbers comprise one or more light members disposed within a body or housing member, and one or more batteries also disposed within the body or housing member and coupled to the light members for operating or energizing the light members.

For example, U.S. Pat. No. 2,201,588 to Kuhns discloses one of the typical fishing bobbers comprising a bulb supporting bracket slidably disposed within a body or housing member, and a light member or bulb disposed on the bulb supporting bracket, and a battery also disposed within the body or housing member. The bulb supporting bracket is arranged to be slid or moved relative to the housing member in order to selectively actuate the light member to electrically engage with the battery and to allow the light member to be selectively operated or energized by the battery when a fish bites on the fishline to which the bobber is attached.

The bulb supporting bracket is required to be firmly wedged between the battery and a tubular holder for slidably and electrically contacting with the side of the battery. However, the bulb supporting bracket may not be effectively slid or moved relative to the housing member due to the firmly wedge between the battery and the tubular holder. In addition, a friction and rubbings and scrubbings may be generated between the bulb supporting bracket and the battery and the tubular holder and the bulb supporting bracket may not be effectively and electrically contacted and coupled to the light member after use.

U.S. Pat. No. 4,291,484 to Young discloses another typical illuminated fishing floats comprising a conventional pen light disposed within a support member, and a reflector for reflecting the light generated by the pen light. The fishing float is arranged to be submerged when a fish strikes the float, and the disappearance of the normally visible illumination indicates a strike.

However, the pen light may not be effectively switched on or off when the fish strikes the float, i.e., no switch devices may be used to effectively switch on or off the pen light when the fish strikes the float, such that the user also may not precisely know when the fish strikes the float.

The present invention has arisen to mitigate and/or obviate the afore-described disadvantages of the conventional light devices for fishing bobbers.

SUMMARY OF THE INVENTION

The primary objective of the present invention is to provide a fishing bobber including a sensitive light device for generating lights when a fish bites on the line to which the bobber is attached and for guiding the user to pull the fishline at the right time and to suitably catch the fish.

In accordance with one aspect of the invention, there is provided a bobber comprising an outer receptacle including a hollow chamber, and including an opening communicating with the hollow chamber of the outer receptacle, a housing engaged into the opening of the outer receptacle and attached to the outer receptacle and including a casing extended into the hollow chamber of the outer receptacle, the casing including a bore, a circuit board disposed in the housing, a processor device and at least one light member attached onto the circuit board, at least one battery attached to the casing and including a central electrode and a case electrode, the circuit board including two conductor members extended from the circuit board and electrically coupled to the central electrode and the case electrode of the batteries respectively for electrically coupling the circuit board to the battery, a switch device coupled to the processor device and including two conductor blades each including a leg extended into the bore of the casing, and the legs of the conductor blades being spaced away from each other, and a ball disposed in the bore of the casing and engageable with the legs of the conductor blades for selectively and electrically coupling the legs of the conductor blades together, the ball is arranged to be seated and electrically engaged with the legs of the conductor blades for electrically coupling the legs of the conductor blades together, and arranged to be disengaged from either or both the legs of the conductor blades and to switch off the electrical coupling between the legs of the conductor blades when a fish strikes.

The outer receptacle includes an extension extended downwardly therefrom and shaped to present relatively little water resistance. The processor device is arranged to actuate the light member to generate flash light when the fish strikes. The light member is coupled to the processor device with a resistor.

One or more sealing rings are engaged between the outer receptacle and the housing for making a water tight seal between the outer receptacle and the housing. The casing includes two notches communicating with the bore of the casing, and the legs of the conductor blades are engaged into and seated in the notches of the casing.

Further objectives and advantages of the present invention will become apparent from a careful reading of the detailed description provided hereinbelow, with appropriate reference to the accompanying drawings.

DETAILED DESCRIPTION OF THE PREFERRED-EMBODIMENT

Figure 1:
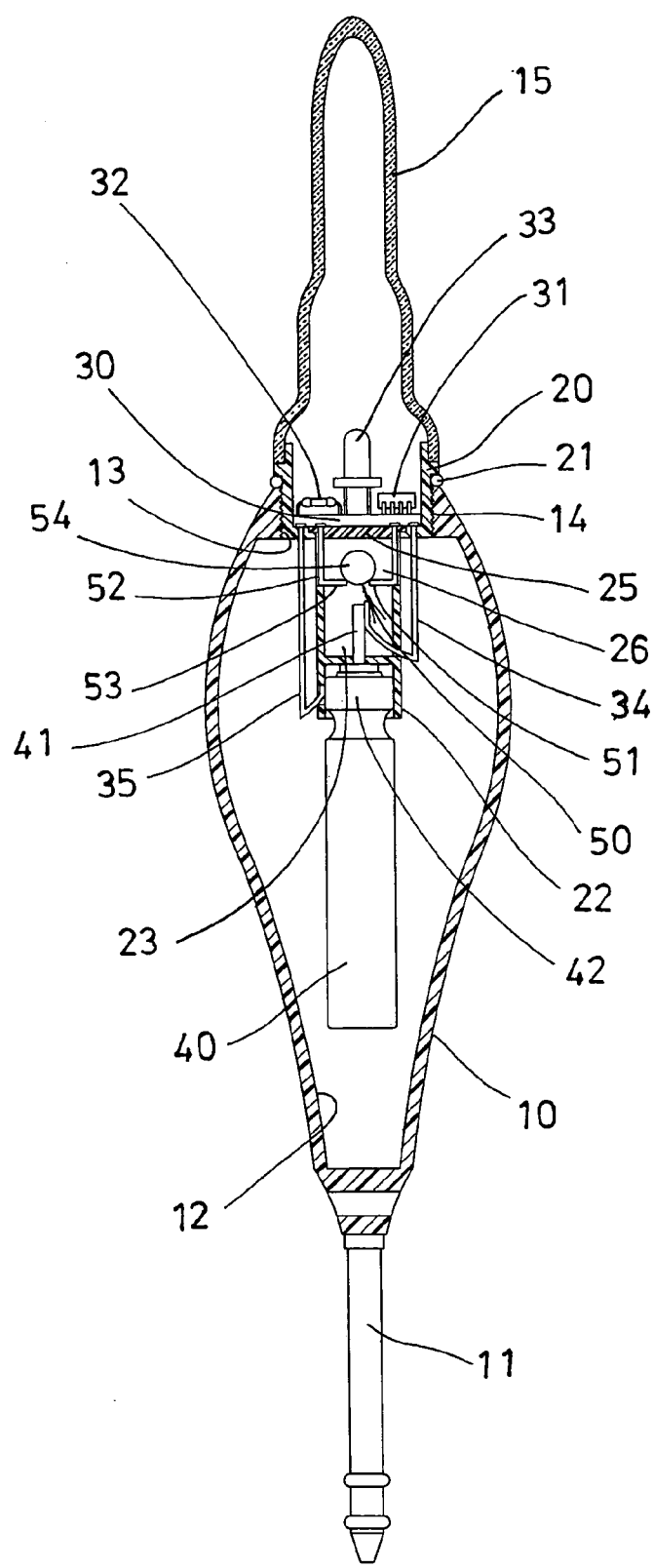
FIG. 1 is a cross sectional view of a fishing bobber in accordance with the present invention.
Figures 2, 3:
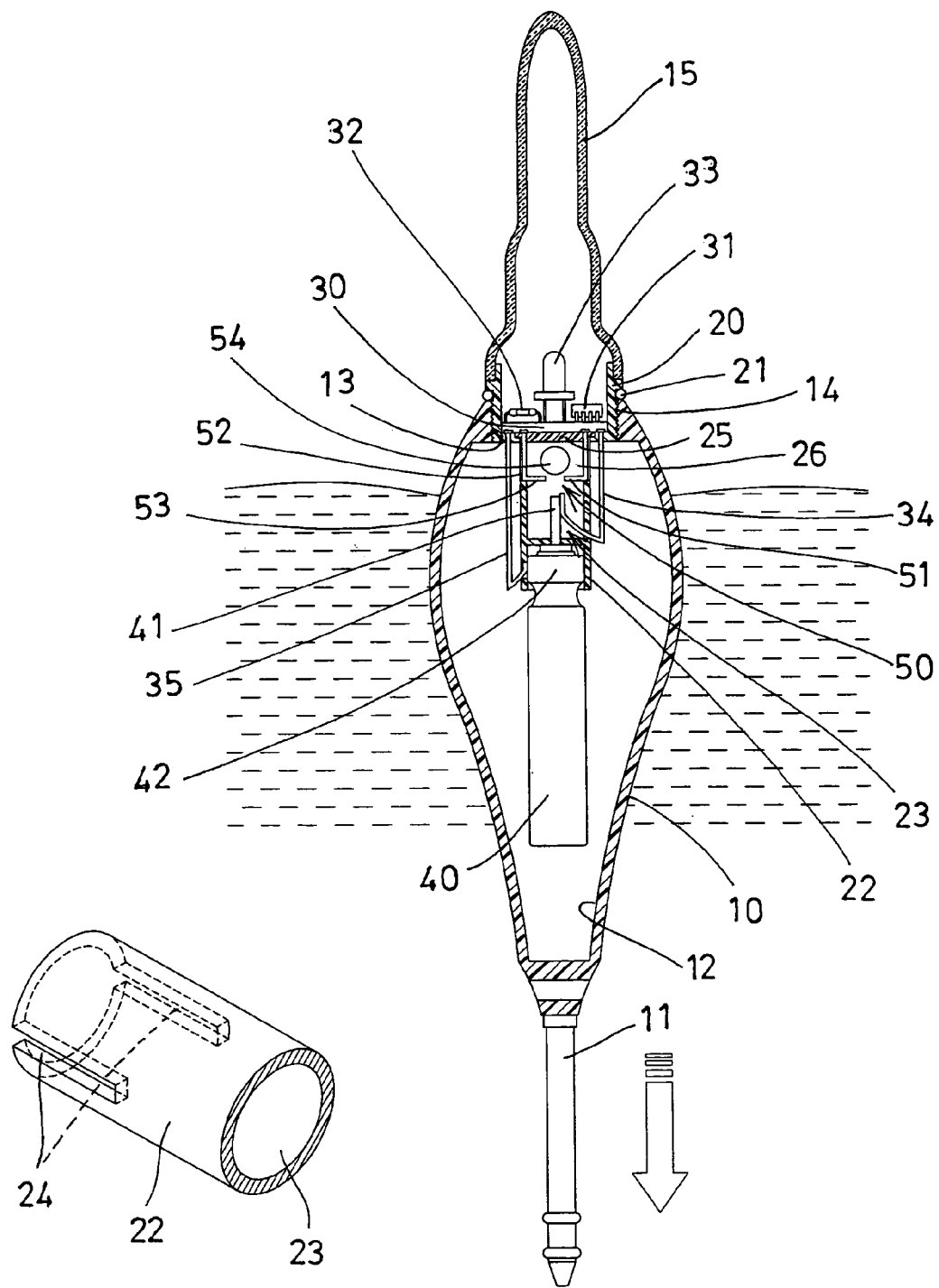
FIG. 2 is a cross sectional view similar to FIG. 1, illustrating the operation of the fishing bobber.
FIG. 3 is a partial perspective view illustrating a battery supporting casing of the fishing bobber.

Referring to the drawings, and initially to FIGS. 1–3, a fishing bobber in accordance with the present invention comprises an outer receptacle 10 including an extension 11 extended downwardly therefrom and shaped to present relatively little water resistance when a fish strikes. The outer receptacle 10 includes a hollow chamber 12 formed therein for receiving various objects which will be discussed hereinafter, and includes an opening 13 formed in the upper portion thereof and communicating with the hollow chamber 12 of the outer receptacle 10.

A housing 20 is engaged into the upper opening 13 of the outer receptacle 10 and attached or secured to the outer receptacle 10 with such as a threading engagement 14, fasteners or latches (not shown), or by force-fitted engagements or by welding processes. One or more sealing rings 21 may be disposed or engaged between the outer receptacle 10 and the housing 20 for making a water tight seal between the outer receptacle 10 and the housing 20. The housing 20 includes a casing 22 attached thereto or extended therefrom, or the casing 22 may also be formed integral with the housing 20, and extended into the hollow chamber 12 of the outer receptacle 10.

Figure 4:
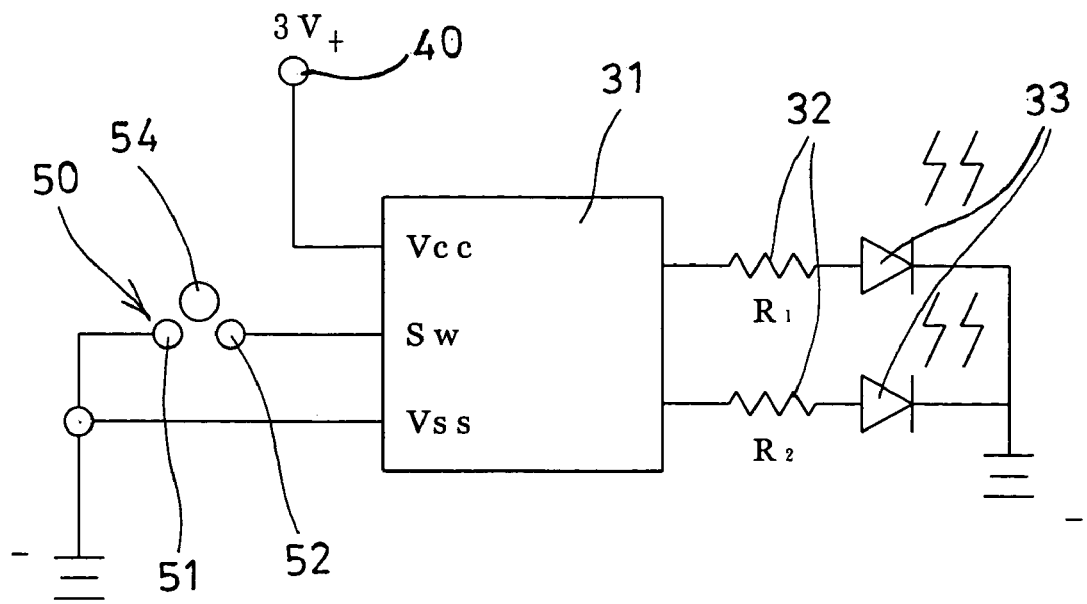
FIG. 4 is a plan schematic view illustrating an electric circuit of the fishing bobber.
Figure 5:
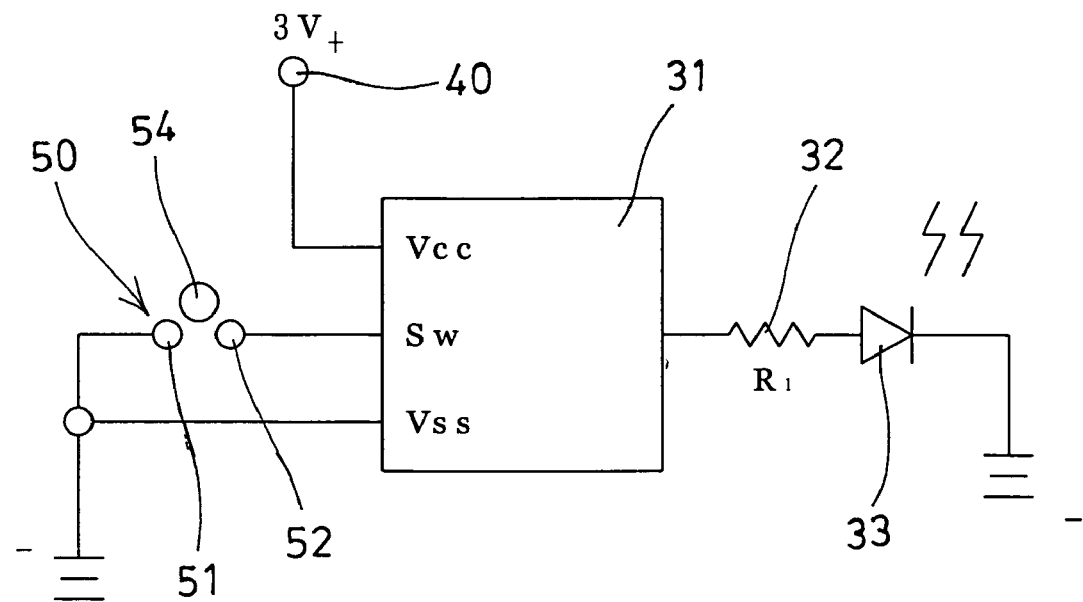
FIG. 5 is a plan schematic view similar to FIG. 4, illustrating the other arrangement of the electric circuit of the fishing bobber.

A circuit board 30 is disposed or engaged into and secured to the housing 20, an integrated circuit or a processor device 31 and one or more resistors 32 and one or more light members 33 or other electrical parts or elements (not shown) are disposed or attached onto the circuit board 30 and may be electrically coupled together to form various electric circuits, such as those shown in FIGS. 4 and 5. As also shown in FIGS. 4, 5, the light members 33 may each be coupled to the processor device 31 with one of the resistors 32. One (FIG. 5) or more (FIG. 4) light members 33 may be selectively coupled to the processor device 31.

One or more batteries 40 may be attached or secured to the casing 22 and include a central electrode 41 and a case electrode 42 for electrically coupling to and for energizing the electrical parts or elements. For example, the circuit board 30 includes two conductor members 34, 35 extended from the circuit board 30 and extended into the casing 22, and electrically coupled to the central electrode 41 and the case electrode 42 of the batteries 40 respectively (FIGS. 1, 2) for electrically coupling the electrical parts or elements of the circuit board 30 to the batteries 40. As shown in FIG. 3, the casing 22 includes a bore 23 formed therein, and includes one or more, such as two notches 24 formed therein and communicating with the bore 23 of the casing 22.

A switch device 50 is provided and coupled to the processor device 31, and includes two conductor blades 51, 52 engaged into and seated in the notches 24 of the casing 22, and the conductor blades 51, 52 each includes a leg 53 extended into the bore 23 of the casing 22 (FIGS. 1, 2), and the legs 53 of the conductor blades 51, 52 are spaced away from each other for a predetermined distance. A spherical member or a ball 54 is disposed in the bore 23 of the casing 22 and engageable with the legs 53 of the conductor blades 51, 52 for selectively and electrically coupling the legs 53 of the conductor blades 51, 52 together (FIG. 1).

A cap 25 is engageable in the open top of the casing 22 and secured to the casing 22 or the housing 20 with such as fasteners or latches (not shown), or by force-fitted engagements or by welding processes, for enclosing the bore 23 of the casing 22 and for retaining the ball 54 in the bore 23 of the casing 22. The legs 53 of the conductor blades 51, 52 include a shape or a width arranged to retain the ball 54 in the upper portion 26 of the bore 23 of the casing 22 or between the legs 53 of the conductor blades 51, 52 and the cap 25, and for preventing the ball 54 from being moved beyond the legs 53 of the conductor blades 51, 52 to electrically engage with the central electrode 41 of the batteries 40 and the conductor members 34, 35.

A hood or cover 15 may be secured to the housing 20 with such as fasteners or latches (not shown), or by force-fitted engagements or by welding processes, for enclosing the housing 20 and for preventing water from entering into the housing 20 and the casing 22 and the outer receptacle 10. The cover 15 is preferably made of transparent or semi-transparent materials, for allowing the lights generated by the light members 33 to be emitted through the cover 15 and to be seen by people.

In operation, as shown in FIG. 1, the ball 54 is arranged to be seated and electrically engaged with or between the legs 53 of the conductor blades 51, 52 for electrically coupling the legs 53 of the conductor blades 51, 52 together and for allowing the light members 33 to be normally energized to generate the light (FIG. 5) and to emit the light through the cover 15 for indicating the position of the fishing bobber. As shown in FIG. 2, when a fish strikes and when the outer receptacle 10 is pulled downwardly into the water or swung or vibrated or tilted or inclined relative to the water by the fish, the ball 54 will be caused to be disengaged from either or both of the legs 53 of the conductor blades 51, 52 to switch off or to terminate the electrical coupling between the legs 53 of the conductor blades 51, 52, and the processor device 31 may actuate the light members 33 to generate such as the flash light, in order to indicate that the fish bites on the fishline to which the bobber is attached and to guide the user to pull the fishline at the right time and to suitably catch the fish.

Alternatively, as shown in FIG. 4, one of the light members 33 may be normally energized to generate the light and to emit the light to indicate the position of the fishing bobber, and the other light member 33 may be used or arranged to be energized and to generate the flash light when the fish strikes. It is to be noted that the conductor members 34, 35 are not required to be slid and moved relative to the central electrode 41 and the case electrode 42 of the batteries 40 respectively, and the ball 54 will be caused to be disengaged from the legs 53 of the conductor blades 51, 52 when a fish strikes and when the outer receptacle 10 is pulled downwardly into the water by the fish, such that the switch device 50 is sensitive to indicate that the fish strikes.

Accordingly, the fishing bobber in accordance with the present invention includes a sensitive light device for generating indicating lights when a fish bites on the line to which the bobber is attached and for guiding the user to pull the fishline at the right time and to suitably catch the fish.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bobber comprising:
    an outer receptacle including a hollow chamber, and including an opening communicating with said hollow chamber of said outer receptacle,
    a housing engaged into said opening of said outer receptacle and attached to said outer receptacle and including a casing extended into said hollow chamber of said outer receptacle, said casing including a bore,
    a circuit board disposed in said housing,
    a processor device and at least one light member attached onto said circuit board,
    at least one battery attached to said casing and including a central electrode and a case electrode, said circuit board including two conductor members extended from said circuit board and electrically coupled to said central electrode and said case electrode of said batteries respectively for electrically coupling said circuit board to said at least one battery, a switch device coupled to said processor device and including two conductor blades each including a leg extended into said bore of said casing, and said legs of said conductor blades being spaced away from each other, and a ball disposed in said bore of said casing and engageable with said legs of said conductor blades for selectively and electrically coupling said legs of said conductor blades together, said ball being arranged to be seated and electrically engaged with said legs of said conductor blades for electrically coupling said legs of said conductor blades together, and arranged to be disengaged from either or both said legs of said conductor blades and to switch off the electrical coupling between said legs of said conductor blades when said outer receptacle is pulled or swung or vibrated or tilted relative to water by a fish.

2. The bobber as claimed in claim 1, wherein said outer receptacle includes an extension extended downwardly therefrom and shaped to present little water resistance.

3. The bobber as claimed in claim 1, wherein said processor device is arranged to actuate said at least one light member to generate a flashing light when the fish strikes.

4. The bobber as claimed in claim 1, wherein at least one sealing ring is engaged between said outer receptacle and said housing for making a water tight seal between said outer receptacle and said housing.

5. The bobber as claimed in claim 1, wherein said at least one light member is coupled to said processor device with a resistor.

6. The bobber as claimed in claim 1, wherein said casing includes two notches communicating with said bore of said casing, and said legs of said conductor blades are engaged into and seated in said notches of said casing.

* * * * *